(No Model.)

W. H. WHITE.
FORK FOR HOLDING EARS OF CORN.

No. 592,897. Patented Nov. 2, 1897.

Witnesses
L. M. Gillis.
K. A. Gau

Inventor,
William H. White,
by John Wedderburn
Attorney

UNITED STATES PATENT OFFICE.

WILLIAM H. WHITE, OF HARROLD, SOUTH DAKOTA.

FORK FOR HOLDING EARS OF CORN.

SPECIFICATION forming part of Letters Patent No. 592,897, dated November 2, 1897.

Application filed June 29, 1896. Serial No. 597,429. (No model.)

*To all whom it may concern:*

Be it known that I, WILLIAM H. WHITE, a citizen of the United States, residing at Harrold, in the county of Hughes and State of South Dakota, have invented certain new and useful Improvements in Forks for Holding Ears of Corn; and I do hereby declare the following to be a full, clear, and exact description of the invention, such as will enable others skilled in the art to which it appertains to make and use the same.

My invention relates to forks for holding ears of corn when being eaten from the cob, so that the fingers or table-cloth will not become soiled.

My object is to provide an improved fork of the class described wherein means will be provided for accommodating ears of corn of different lengths and also to provide devices for turning the ear on its longitudinal axis as the corn is eaten from the cob.

The invention consists in those novel features and combinations which will appear more fully hereinafter.

Figure 1:
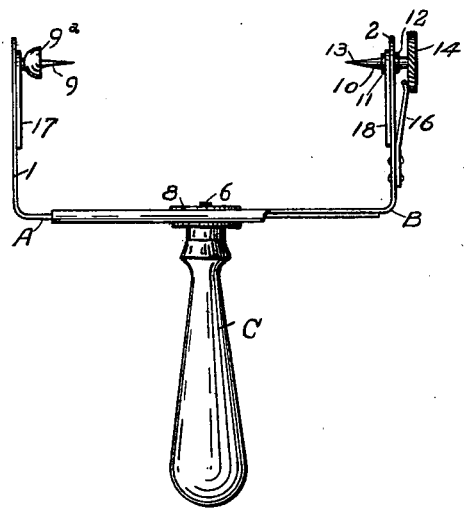
Figure 2:
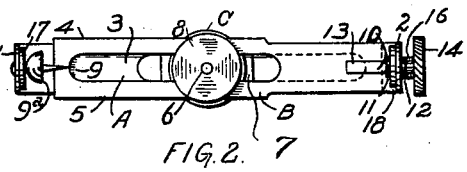
Figure 3:
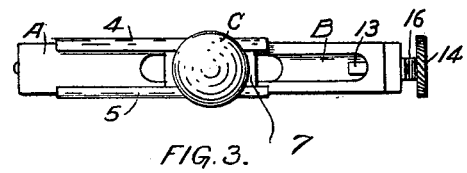
Figure 4:
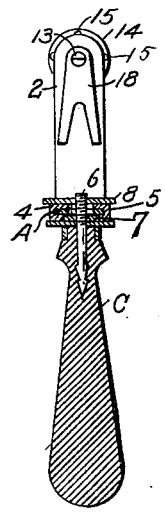
Figure 5:
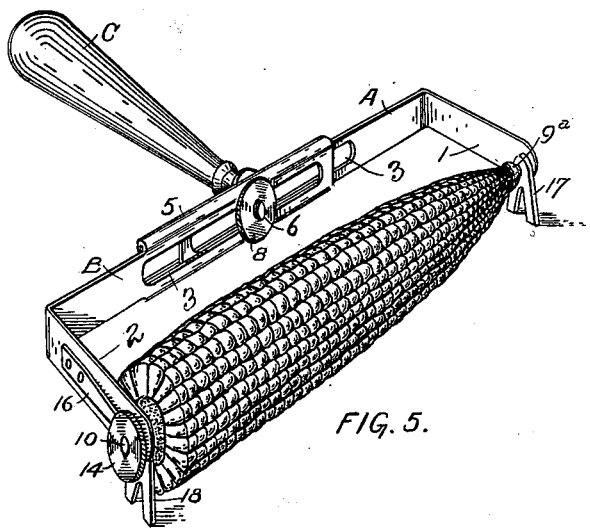

In the accompanying drawings, Figure 1 is a side elevation; Fig. 2, a plan view; Fig. 3, a bottom view; Fig. 4, a vertical section taken through the handle and looking toward the clutch mechanism, and Fig. 5 a view showing the fork as holding an ear of corn and resting on the table.

A and B designate the adjustable sections of the fork, which are provided with upright supporting-arms 1 and 2, respectively. Each section is provided with an elongated slot 3, and the section B also has guide-lips 4 and 5, which are adapted to receive the section A and permit a relative sliding movement of the sections.

C designates a handle which is provided with a screw-threaded shank 6, adapted to pass loosely through the slots 3. The handle is also provided with a guide-plate 7, which is adapted to fit snugly yet easily in between the lips 4 and 5 and forms, as it were, a support for the sections A and B. A thumb-nut or washer 8, adapted to screw on the shank 6, affords the means for locking the sections together when they have been adjusted.

The numeral 9 designates a conical centering-pin which projects from the arm 1 and is adapted to receive one end of the ear of corn. This centering-pin is provided with a cup $9^a$. The arm 2 is provided with an aperture which snugly receives a short rotatable spindle 10. Circular washers 11 and 12 are securely connected to this spindle on the opposite sides of the arm 2. The spindle 10 is formed into a wedge-shaped clutch 13, which is adapted for insertion in one end of the corn-ear. The outer end of the spindle 10 carries a broad circular thumb-wheel 14, whose inner face is provided with a series of holes 15, located in the circumference of a circle. A spring-catch 16, fastened to the arm 2, has its upper free end provided with a lug which is adapted to enter the holes 15 successively when the thumb-wheel is turned. The spindle 10 and the centering-pin 9 are located in alinement, so that the ear of corn will be held in proper position. The numerals 17 and 18 designate crotched rests that are loosely pivoted to the centering-pin 9 and spindle 10, respectively, so that they will swing by gravity and rest on the table when the fork is laid thereon.

The operation is simple and as follows: The sections A and B are opened somewhat wider than the length of the ear of corn and one end of the ear forced on the clutch-pins 13. The sections are then slid together and the other end of the ear forced on the centering-pin 9. The sections may now be locked together by the thumb-washer 8. After the corn has been eaten from one portion of the ear the thumb-wheel can be turned and a fresh portion of the ear presented. The corn is held away from the table when the fork is laid thereon by means of the rests.

Having thus described my invention, what I claim as new is—

1. A corn-fork, comprising in combination a handle, sections adjustably connected thereto, a centering-pin connected to one of the sections and adapted to enter an ear of corn, rotatable clutch mechanism adapted for engagement with the corn and connected to the other section, and catch mechanism for holding the clutch locked, substantially as described.

2. A corn-fork, comprising in combination, sections having arms, a centering-pin connected to one of said arms, a spindle journaled in the other arm and provided with a clutch, a thumb-nut carried by said spindle which is provided with a series of holes, and a spring having a free end adapted for reception in said hole whereby the clutch can be locked.

3. A corn-fork, comprising in combination, sections having arms, both of said sections being provided with elongated slots, one of said sections being slidable in lips projecting from the other section, a handle having a screw-threaded stem which passes through the slots in the sections, a clamping-nut on said stem, and clutch mechanism carried by the arms which is adapted for engagement with an ear of corn.

In testimony whereof I have signed this specification in the presence of two subscribing witnesses.

WILLIAM H. WHITE.

Witnesses:
ELMER E. MAXWELL,
JOHN W. TOOMEY.